United States Patent
Gelmetti et al.

(10) Patent No.: US 7,363,183 B2
(45) Date of Patent: Apr. 22, 2008

(54) METHOD FOR CORRECTING SENSOR SIGNAL

(75) Inventors: Andrea Gelmetti, S. Giovanni In Persiceto (IT); Vesna Music, London (GB); Jonathan Crook, London (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/484,818

(22) Filed: Jul. 11, 2006

(65) Prior Publication Data

US 2007/0162243 A1 Jul. 12, 2007

(30) Foreign Application Priority Data

Jul. 14, 2005 (EP) .................................. 05254419

(51) Int. Cl.
*G06F 19/00* (2006.01)
(52) U.S. Cl. ............................ 702/100; 702/45; 702/85
(58) Field of Classification Search ................... 702/45, 702/100, 85; 73/118.2; 123/568.21, 568.26; 701/108, 114
See application file for complete search history.

(56) References Cited

U.S. PATENT DOCUMENTS

| 3,688,750 | A | * | 9/1972 | O'Neill | ...................... 123/488 |
| 2004/0045346 | A1 | | 3/2004 | Minoru et al. | |
| 2006/0224298 | A1 | * | 10/2006 | Lang | .......................... 701/114 |

FOREIGN PATENT DOCUMENTS

| EP | 0845587 | 6/1998 |
| EP | 1371837 | 12/2003 |
| FR | 2824596 | 11/2002 |
| JP | 2001107797 | 4/2001 |

* cited by examiner

*Primary Examiner*—Bryan Bui
(74) *Attorney, Agent, or Firm*—David P. Wood (57) ABSTRACT

The invention provides a method of compensating for the error of a signal indicative of the mass of air flow output from an air mass flow sensor for an internal combustion engine, the method comprising deriving an air mass flow value from an air mass flow sensor output, calculating a compensated air mass flow value based on the air mass flow value and a compensation value, calculating an estimated air mass flow value from engine operating parameter values, calculating a new compensation value based upon the compensated air mass flow value and the estimated air mass flow value and using the new compensation value for subsequent calculations of the compensated air mass flow value.

19 Claims, 8 Drawing Sheets

METHOD FOR CORRECTING SENSOR SIGNAL

TECHNICAL FIELD

The present invention relates to a method of correcting a sensor signal. More particularly, the invention is concerned with providing a method of compensating for calibration errors or "sensor drift" of a signal that is output from a sensor for measuring the mass of airflow entering an internal combustion engine.

BACKGROUND TO THE INVENTION

Manufacturers of internal combustion engines are under constant pressure to achieve reductions in the quantities of harmful gases and particulates that are produced by the engine. At the same time, it is necessary to maintain current levels of engine performance to which consumers have become accustomed. In order to satisfy these requirements, it is essential both to monitor accurately and to control precisely the operational parameters of the engine.

The ability to measure accurately the mass of air flow that enters into the engine is critical to the efficient operation of modern engine management systems. Typically, an air mass flow (AMF) sensor is employed to perform this function.

Air mass flow sensors typically output a variable voltage that is proportional to the amount of air entering the engine cylinders via the air inlet of the engine. Some types of air mass flow sensors may also output a variable frequency voltage based upon the mass of air flowing therethrough. One approach taken to measure the mass of airflow is based on the so-called "hot wire" principle, in which a voltage is applied to an electrically conductive element in the form of a wire. The wire is disposed in an airflow sampling channel and is heated by an electrical current that is induced by the applied voltage. As air flows across the wire, the temperature of the wire is reduced and control circuitry will act to increase the current flowing through the wire in order to maintain a predetermined temperature. The air mass flow sensor outputs a voltage proportional to the current flow to an engine management system. The engine management system will derive a value of air mass flow from the received voltage value by reference to an air mass flow sensor characteristic.

Figure 1:
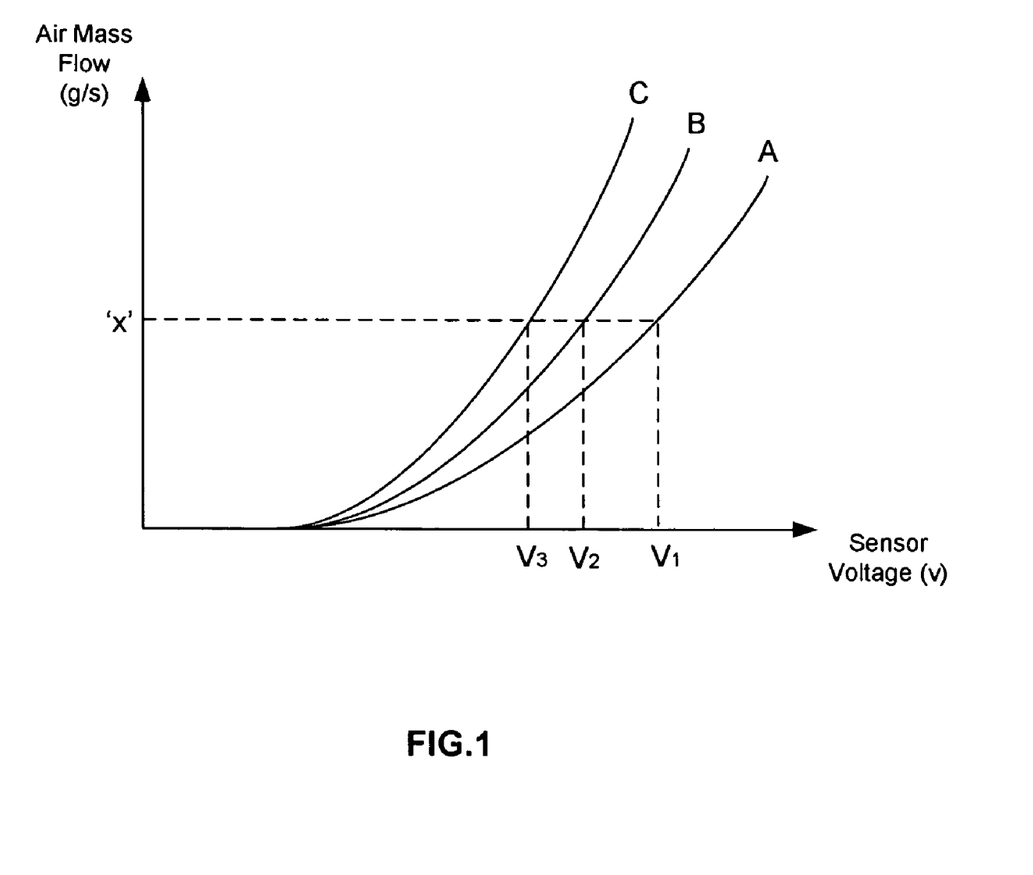
FIG. 1 represents a set of typical voltage/airflow characteristic graphs of an air mass flow sensor showing how the characteristic may change over time.

A typical air mass flow sensor characteristic is shown in FIG. 1. The ordinate axis denotes the air mass flow in grams per second (g/s) and the abscissa axis denotes the corresponding voltage (V) that is output by the sensor. Line A represents the air mass flow sensor characteristic as calibrated and stored in the engine management system. It will be appreciated that the relationship between voltage and air mass flow is non-linear.

A disadvantage of air mass flow sensors is that their characteristic is susceptible to drift over time. As a result, the voltage output from the sensor, which is input to the engine management system, will be interpreted as an incorrect value of air mass flow. The problem is exacerbated in applications where the air mass flow sensor is required to measure accurately a wide range of flow rates, for example on large capacity engines. It can be seen from FIG. 1 that for a specific value 'X' of air mass flow, the air mass flow sensor will output gradually decreasing values of voltage, V1, V2, and V3 respectively, as the time from the last sensor calibration increases, as shown by curves A, B and C, respectively.

The error-prone voltage signal that is output from the air mass flow sensor adversely affects the ability of the engine management system to regulate accurately other engine operating parameters, such as the air-fuel ratio, that are vital for efficient combustion. Therefore, critical operational factors such as engine fuel economy, engine performance and exhaust emissions are likely to be influenced undesirably.

Although it is possible to re-calibrate the air mass flow sensor periodically, this would be inconvenient and time consuming since it would be necessary to present the vehicle to a re-calibration specialist to have the work carried out.

SUMMARY OF INVENTION

The invention is directed to addressing the problem described above and, from a first aspect, provides a method of compensating for the calibration error of a signal indicative of the mass of air flow from an air mass flow sensor for an internal combustion engine. The method comprises deriving an air mass flow value from an air mass flow sensor output, calculating a compensated air mass flow value based on the air mass flow value and a compensation value, calculating an estimated air mass flow value from engine operating parameter values, calculating a new compensation value based upon the compensated air mass flow value and the estimated air mass flow value, and using the new compensation value for subsequent calculations of the compensated air mass flow value.

Preferably, the step of deriving an air mass flow value includes converting the air mass flow sensor output by means of an interpolated data map, wherein the interpolated data map is defined by a plurality of voltage/flow pairs.

A benefit of the invention is that the value of air mass flow that is measured by the air mass flow sensor has a compensation value, or correction factor, applied to it constantly in order to compensate for the drift in the air mass flow sensor. Moreover, the compensation values are updated periodically when certain enabling conditions are satisfied, as will be described herein, so as to adapt to the gradually increasing magnitude of sensor drift.

In a preferred embodiment of the invention, each of the plurality of voltage/flow pairs are identified by a respective index value, each index value relating to a predetermined engine operating region. As a result, the compensation value to apply to the measured value of air mass flow is selected from a plurality of compensation values, wherein the compensation value is selected based upon the index that is identified according to the current engine operating region. Thus, the number of compensation values correspond to the number of index values.

Preferably, the plurality of compensation values are stored in the form of a one-dimensional data map.

A preferred feature of the invention is that the step of calculating a new compensation value is triggered by a timer having a plurality of predetermined limits. The limits may be set depending on how frequently it is desired to update a particular compensation value that corresponds to a particular engine operating region. For example, preferably, the method includes incrementing the timer to count the number of times it is verified that each one of a plurality of enabling conditions is satisfied. The step of triggering the calculation of a new compensation value may be initiated when the number of times exceeds the predetermined limit for the associated engine operating region.

Advantageously, the timer limits are selected to be relatively high for frequently encountered engine operating regions and relatively low for less frequently encountered engine operating regions. This ensures that system resources are not burdened unnecessarily by attempting to update compensation values that relate to commonly encountered engine operating regions more frequently than is necessary.

It is a preferred feature of the invention that the step of verifying the plurality of enabling conditions includes the step of comparing a first stored fuel demand value with a second stored fuel demand value and determining if the difference between the first and second stored fuel demand values is within a predetermined limit.

From a second aspect, the invention resides in an engine control system for use in an internal combustion engine, the engine control system including a compensating unit for compensating for the error of a signal indicative of the mass of air flow from an air mass flow sensor for an internal combustion engine, the compensating unit including a deriving unit for deriving an air mass flow value from an air mass flow sensor output, a summing unit for calculating a compensated air mass flow value based on the air mass flow value and a compensation value, a calculating unit for calculating an estimated air mass flow value from engine operating parameter values, and a learning unit for calculating a new compensation value based upon the compensated air mass flow value and the estimated air mass flow value and using the new compensation value for subsequent calculations of the compensated air mass flow value.

It will be appreciated that preferred features of the first aspect of the invention may be incorporated in the second aspect of the invention.

BRIEF DESCRIPTION OF THE DRAWINGS

In order for the invention to be more readily understood, reference will now be made, by way of example only, to the accompanying drawings in which.

DETAILED DESCRIPTION OF THE PREFERRED EMBODIMENTS

In the following description, the term "engine speed" is used in the usual context and takes the units of revolutions per minute (rpm). "Engine load" is a synonym for "fuel demand" and takes the units of mg fuel. The term "operating point" is used to define the instantaneous operating condition of the engine at any given time and the term "operating region" denotes a region of grouped engine operating points.

Figure 2:
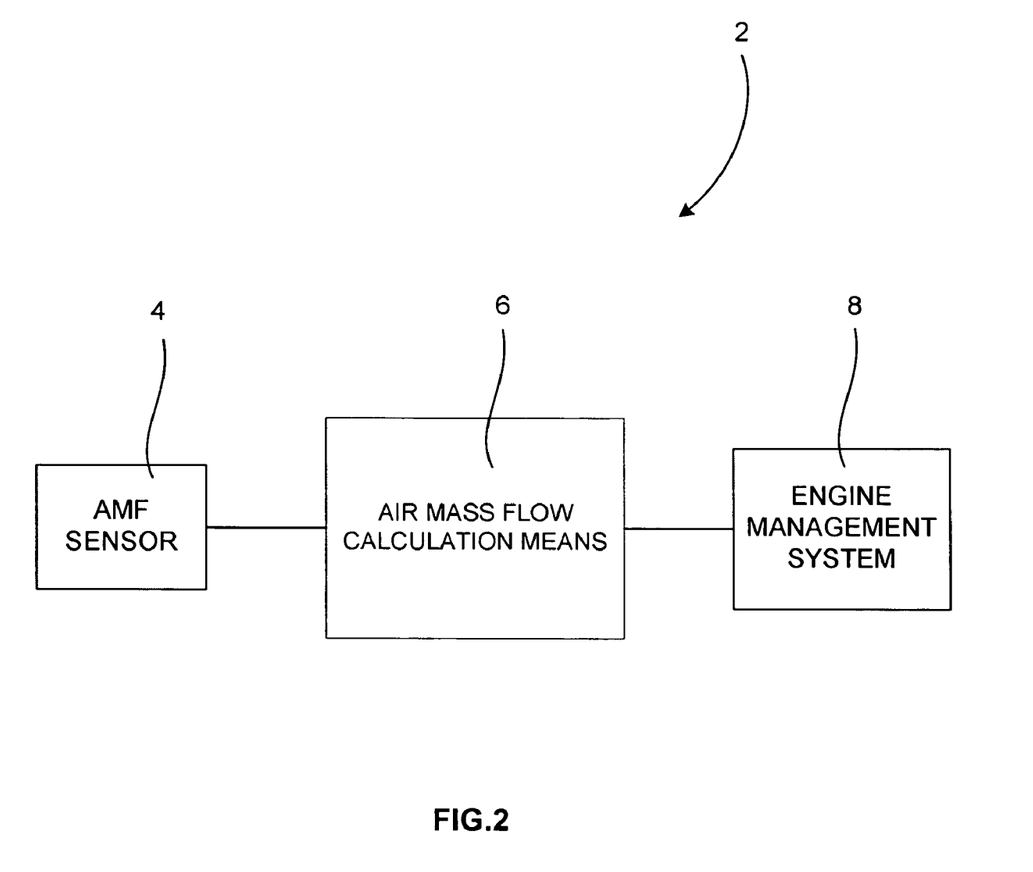
FIG. 2 is a high-level functional block diagram of an embodiment of the invention.

FIG. 2 shows a functional block diagram of an air mass flow sensor compensation system 2 of the invention. The system 2 comprises an air mass flow sensor 4 that is arranged within the fresh air intake of a compression ignition internal combustion engine (not shown). The air mass flow sensor 4 is arranged to provide an input voltage to air mass flow calculation means 6 which receives the voltage value supplied by the air mass flow sensor 4 and calculates a corresponding value of air mass flow. The calculated value of air mass flow is then output by the air mass flow calculation means 6 to an engine management system 8 that uses the received value of air mass flow for subsequent engine control calculations.

Figure 3:
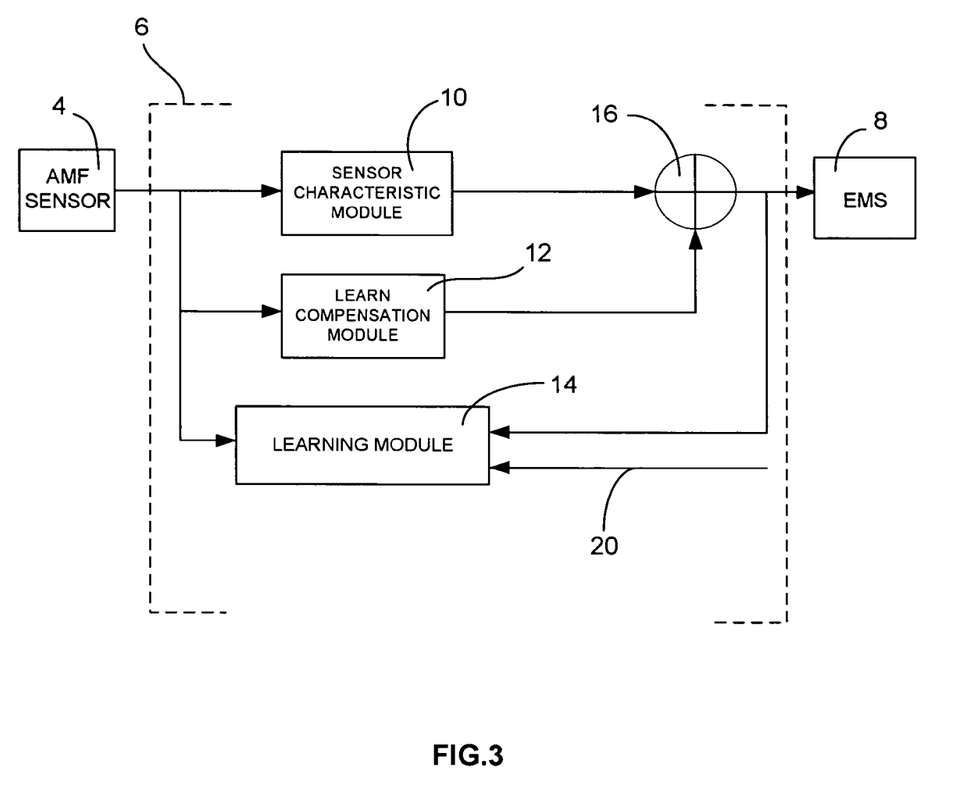
FIG. 3 is a more detailed functional block diagram of that shown in FIG. 2.

Referring to FIG. 3, the air mass flow calculation means 6 comprises a sensor characteristic module 10, a learn compensation module 12 and a learning module 14.

The sensor characteristic module 10 receives a filtered voltage signal from the air mass flow sensor 4 and outputs a signal that is indicative of the mass of air flowing through the air intake manifold. As has been mentioned, the relationship between the mass of airflow and the corresponding voltage value, or the so-called "sensor characteristic", may be illustrated in a graph, such as that shown in FIG. 4.

Figure 4:
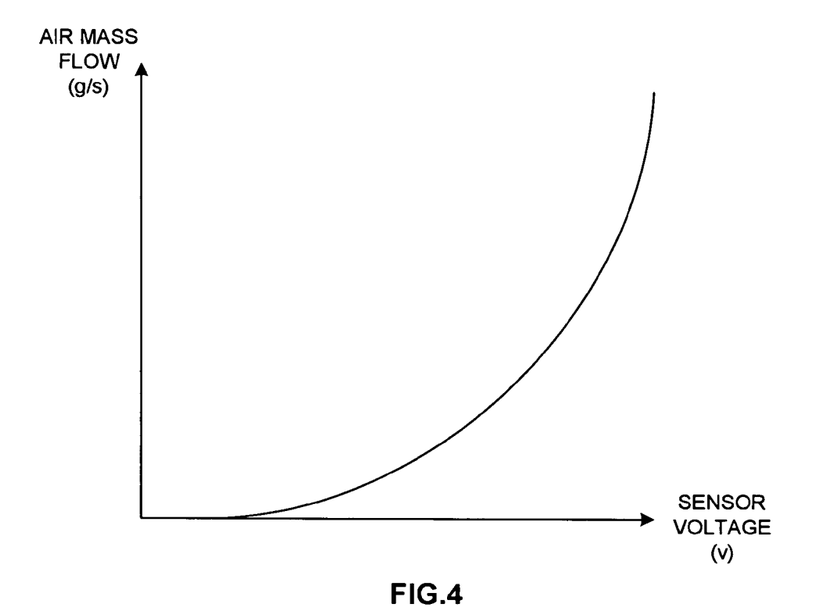
FIG. 4 shows an exemplary sensor characteristic graph that shows values of air mass flow against voltage.

FIG. 4 shows a sensor characteristic having an abscissa axis defined by output voltage values of the air mass flow sensor 4. The ordinate axis of the graph is defined by the mass of airflow that corresponds to a particular sensor output voltage. Thus the graph illustrates how the voltage output of the air mass flow sensor 4 changes according to the mass of air flowing past the air mass flow sensor 4.

Figure 5:
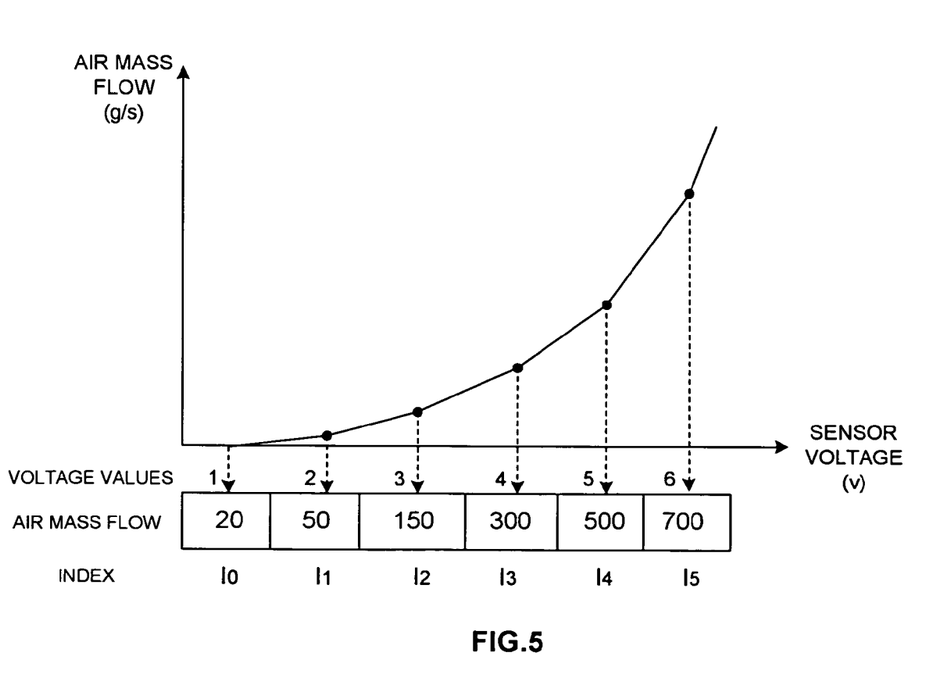
FIG. 5 shows an exemplary interpolated map representing the graph of FIG. 4 together with a corresponding one-dimensional data map.

It will be appreciated that the graph of FIG. 4 is a continuous and non-linear curve that is represented by an infinite number of points. In general, engine management systems do not utilise graphs in this form since the number of points on the graph means that the memory requirement for storing all of the points is impractical. Therefore, in practice, the sensor characteristic is approximated to a limited number of points, or "voltage/flow pairs", such that the values between the points have a linear relationship and can thus be calculated by means of interpolation. This type of interpolated graph is called a "data map" and an example of an interpolated map corresponding to the graph of FIG. 4 is shown in FIG. 5. The map of FIG. 5 is defined by six voltage/flow pairs for simplicity although, in practice, such a map would contain many more voltage/flow pairs.

Such a two-dimensional map is most readily represented in the memory of an engine management system by means of a one-dimensional map. It will be appreciated that a one-dimensional map is readily expressed in computer memory as a data structure known as a one-dimensional array, in which data is stored in a plurality of cells, each of which has a designated index value. Such a one-dimensional map is also shown in FIG. 5, each cell of which, in this case labelled I0 to I5, contains a value of air mass flow that corresponds to a specified voltage value.

Through the use of a one-dimensional map, the sensor characteristic module 10 determines an interpolated value of air mass flow corresponding to the received voltage signal. This value of air mass flow will hereinafter be referred to as the measured value of air mass flow, or "AMF_measured".

Returning to FIG. 3, the filtered voltage from the air mass flow sensor 4 is also input to the learn compensation module 12 of the air mass flow calculation means 6. The learn compensation module 12 outputs a compensatory value of air mass flow which is dependent on the prevailing operating point of the engine. The compensatory value of air mass flow, hereinafter referred to as "AMF_compensation", is added to AMF_measured at a summing junction 16. This results in a value of air mass flow being output from the summing junction 16 which is corrected for sensor drift and provided as an input to the engine management system 8. Hereafter, the output of the summing junction 16 will be referred to as "AMF_corrected".

In addition to providing a corrected value of air mass flow (AMF_corrected) to the engine management system 8, AMF_corrected also serves as a feedback signal that is input into the learning module 14 of the air mass flow calculation means 6. The learning module 14 performs the function of updating the compensation values stored by the learn compensation module 12 so as to adapt continuously to any sensor drift that may disrupt the accuracy of the air mass flow sensor 4. The functionality of the learning module 14 will be described later.

Figure 6:
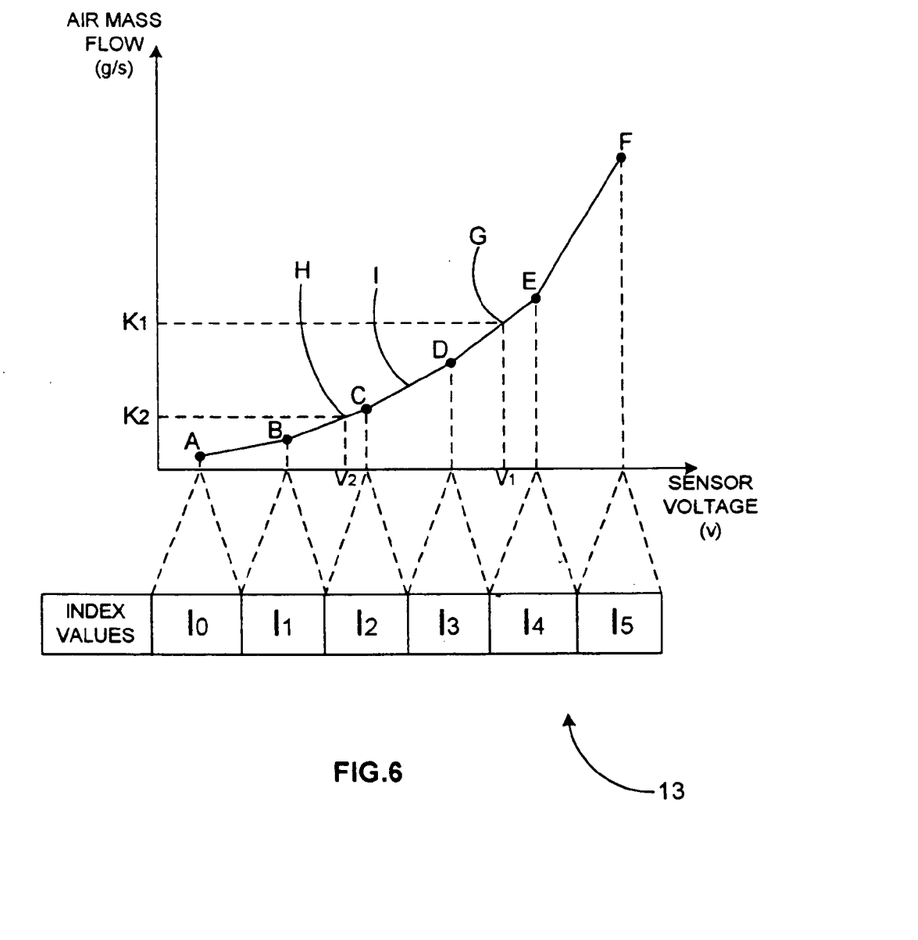
FIG. 6 shows a one-dimensional map corresponding to the one-dimensional map of FIG. 5 and depicts the derivation of index values.

As has been mentioned, the learn compensation module 12 calculates a compensatory output value of air mass flow which is dependent on the value of AMF_measured. As shown in FIG. 6, the learn compensation module 12 includes a one-dimensional data map 13, hereafter referred to as a "compensation map", having a plurality of cells, the number of cells corresponding to the number of voltage/flow pairs by which the sensor characteristic is defined.

Each cell of the compensation map 13 contains a value that corresponds to the amount that the sensor characteristic is calculated to have "drifted" in the region of the sensor characteristic to which the cell applies. The value in each cell is calculated and periodically updated by the learning module 14, as will be described later.

Each cell is identified as having an index value which, in the example shown in FIG. 6, is numbered from I0 to I5. Each index value I0 to I5 corresponds to voltage/flow pair points A to F, respectively. It will be understood that six index values are illustrated in this example for simplicity whereas, in practice, many more index values may be used. In order to determine the contents of which cell should be output to the summing junction 16, the learn compensation module 12 uses an input value of AMF_measured and calculates a corresponding index value that identifies a particular cell of the compensation map 13. For example, a measured voltage value V1 lies on the curve at point 'G' between the voltage/flow pairs indicated by point 'D' and point 'E'. The measured voltage V1 thus results in an interpolated value of AMF_measured of K1. The index attributed to point G is the index that corresponds to the voltage/flow pair immediately preceding the measured voltage V1, i.e. the index I3 that is shown to the left of the value V1. Similarly, if the air mass flow sensor outputs a voltage of V2, which lies at point 'H' between the voltage/flow pairs point 'B' and point 'C', the corresponding index will be I1. Therefore, the value of AMF_compensation stored within the identified cell will be output to the summing junction 16 and will be combined with the value of AMF_measured to provide a corrected value of AMF_corrected.

The index value that is identified in the above process is used in subsequent calculations in order for the learn module 14 to calculate the appropriate compensation value to update the various cells of the compensation map 13. Hereafter the index value shall be referred to as "AMF_index".

Referring once again to FIG. 3, the learning module 14 receives input values of AMF_measured and AMF_corrected. However, the learning module 14 also receives a calculated value of air mass flow 20. The calculated or "trusted" value of air mass flow 20 is a theoretical estimated value that is based on certain engine operating parameters and, in this embodiment, is calculated as a function of engine speed, turbo boost pressure, turbo boost temperature, volumetric efficiency, swept engine volume and the universal gas constant. It should be understood that the aforementioned engine parameters would be familiar to a skilled reader.

The trusted value of the air mass flow 20, hereafter referred to as "AMF_trusted", may be trusted by the system as the true value of air mass flow at a particular engine operating point and, in this embodiment, is calculated using the following equation:

$$\text{AMF\_trusted} = \left( \frac{\text{boost pressure} \times \text{swept volume} \times \text{volumetric efficiency}}{\text{boost temperature} \times \text{universal gas constant}} \right) \times \text{engine speed}$$

The value of AMF_trusted is used by the learning module 14 to calculate the amount by which the air mass flow sensor output has drifted based upon the difference between the value of AMF_corrected and the value of AMF_trusted. Based on the calculated difference, the learning module 14 updates the cell of the compensation map 13 which corresponds to the current operating point of the engine such that the effects of sensor drift are minimised. As a result, the value of AMF_corrected remains substantially equal to the value of AMF_trusted. The learning module 14 is triggered to update the compensation map 13 only once certain enabling conditions are satisfied, as will now be described with reference to FIGS. 7, 8 and 9.

Figure 7:
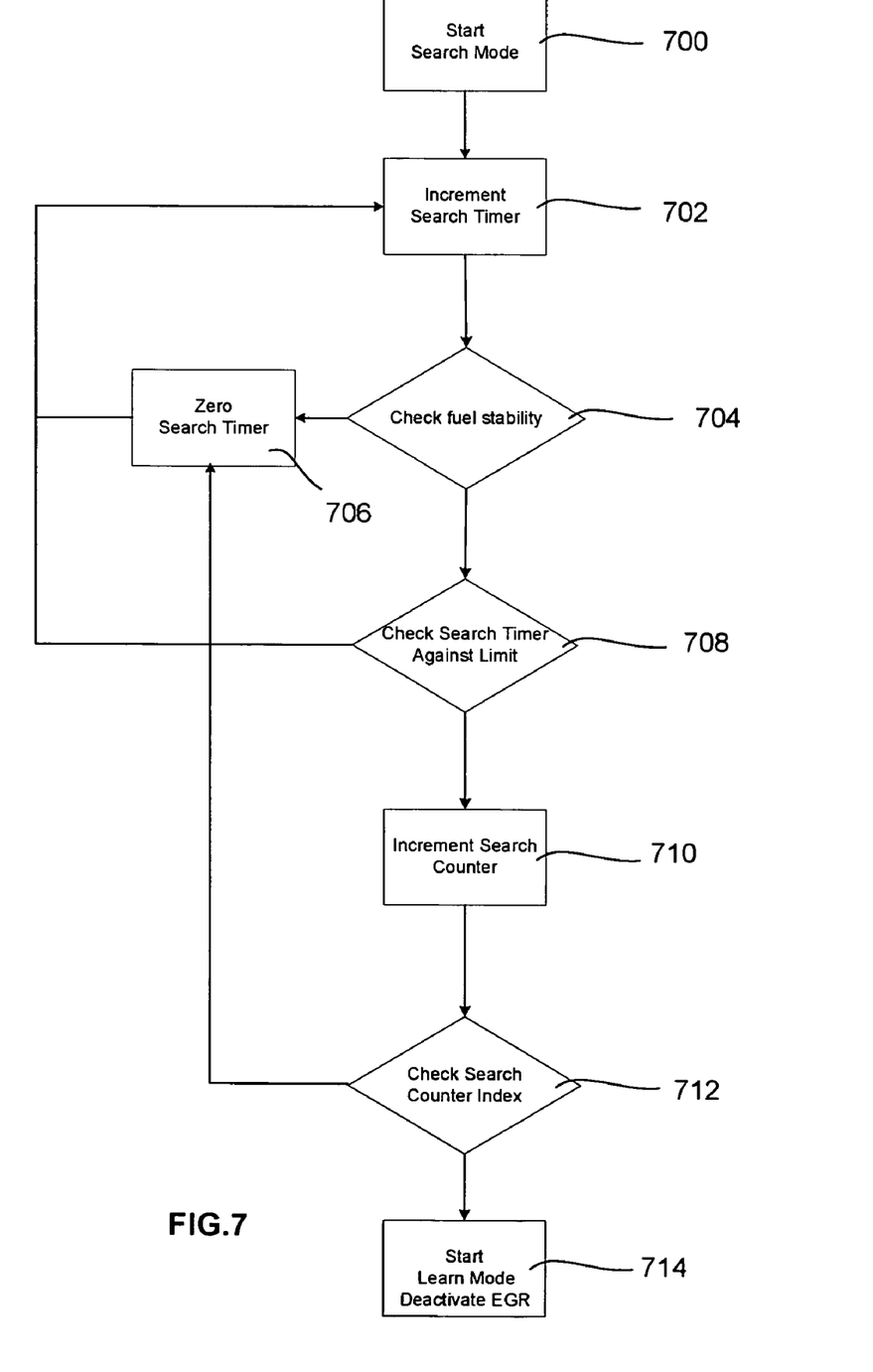
FIG. 7 is a functional flow diagram that represents an embodiment of the invention during the "search mode"

In FIG. 7, an initialisation step 700 represents the start of the process that is executed repeatedly in order to determine, or "search" for, the appropriate moment at which to initiate the learning module 14 and, as a result, update the compensation map 13 stored by the compensation module 12. The initialisation step 700 will be invoked either when the engine is started or following a previous complete iteration of the process, as denoted by the input to the initialisation step 700.

It should be mentioned at this point that modern diesel engine systems employ a technique typically referred to as Exhaust Gas Recirculation (EGR) to tackle the emission of nitrogen oxides in the exhaust gases of the vehicle. As would be well understood by a skilled reader, the EGR technique recirculates a portion of the exhaust gases back into the air intake of the engine. Since the recirculated exhaust gas contains a relatively low level of oxygen, the amount of oxygen entering the engine, and therefore the cylinders, is reduced which therefore reduces combustion temperatures. Although the use of EGR can have a minor detrimental effect on engine performance, the effect is generally considered to be outweighed by the significant reduction of nitrogen oxide emissions that is achieved. Nevertheless, during the calculation of revised values stored in the compensation map 13 it is necessary that EGR is inactive such that the mass of air flow entering the combustion chamber is equal to the mass of ambient air that is inducted into the engine. That is to say, the mass of airflow entering the combustion cylinders of the engine is equal to AMF_measured.

Returning to FIG. 7, step 700 represents the start of a first system mode in which the system will perform engine monitoring prior to initiating the functionality of the learning module 14. This system mode will hereafter be referred to as the "search mode". The initialisation step 700 serves to i) ensure that EGR does not remain disabled ii) reset a search timer, hereinafter referred to as "SEARCH TIMER", and iii) read and store the current value of fuel demand.

The SEARCH TIMER is a means of checking how long the fuel demand has been stable, i.e. has been fluctuating within predetermined limits of the previously stored fuel demand value.

At step 702, the SEARCH TIMER is incremented and at step 704 the stability of the fuel demand value is checked by determining if it is within a predetermined limit of the fuel demand value stored at step 700. If fuel demand is not stable, the process flow will loop repeatedly through steps 706, 702 and 704 respectively until fuel demand is fluctuating within predetermined limits and thus is considered stable. At step 706, the SEARCH TIMER is reset to zero and the current value of fuel demand is stored for comparison during the next loop through steps 702 and 704.

Although not shown on the flow chart of FIG. 7, in addition to checking the stability of fuel demand the system will also continuously check a plurality of engine parameters that must be satisfied for the process to execute. In the present embodiment the system also checks that: the engine brake is inactive; the exhaust brake is inactive; there are no air mass flow sensor faults; there are no boost air pressure sensor faults; there are no boost air temperature sensor faults; the turbo is not in an overspeed condition and the air compressor is inactive. The aforementioned engine parameters would be familiar to the skilled reader and it should be understood that the system may be configured to check more or less parameters as desired. If the fuel demand is unstable, or any of the parameters referred to above are not satisfied, the system will not enter the search mode.

Once the enabling conditions are satisfied, it is checked at step 708 that fuel demand has been stable for a sufficient period of time by comparing the value of the SEARCH TIMER with a predetermined search timer limit. The process will loop through steps 708, 702 and 704 until the value of fuel demand has been stable for a sufficient period of time.

If, as determined by steps 702, 704 and 708, the value of fuel demand is stable for a sufficient period of time such that the predetermined limit of the SEARCH TIMER is exceeded, the process proceeds to step 710 at which point a search counter, hereafter "SEARCH COUNTER", is incremented.

The SEARCH COUNTER comprises multiple counter values, the number of values corresponding to the number of cells in the compensation map 13. Each value in the SEARCH COUNTER has a corresponding predetermined limit, the purpose of which is to distinguish between commonly encountered and rarely encountered engine operating conditions.

By way of explanation, consider engine operating points at which the engine typically spends a high proportion of its operating life, for example running in a vehicle travelling at substantially constant and moderate speed along a road having a substantially zero gradient. Since the engine is likely to reside at these operating points for a relatively large proportion of its life, it is not desirable to waste system resources by attempting to initiate the learning module on every occasion that these operating points arise. Thus, the values of the SEARCH COUNTER that relate to index values corresponding to commonly encountered operating points e.g. index I2 on FIG. 6, have relatively high limits. On the other hand, during such circumstances in which the engine is operating at rarely encountered operating points, for example at a very high engine load that would be required to propel a heavy vehicle up a high incline (e.g. index I5 on FIG. 6), it may be desirable to attempt to initiate the learning module 14 on every occasion that these circumstances arise (assuming that the fuel demand is stable and the enabling conditions are met). Thus, the values of the SEARCH COUNTER that relate to indices corresponding to rarely encountered operating points may have relatively low limits. The predetermined limit values of the SEARCH COUNTER may be derived by experiment or, alternatively, by theoretical means and may be configured upon installation of the software embodying the invention into the appropriate data storage media of the vehicle.

Returning to FIG. 7, if it is determined at search counter check step 712 that the relevant value of SEARCH COUNTER has not been exceeded, the process will return to step 706 at which point the SEARCH TIMER is reset, the last recorded value of fuel demand is stored and the check for fuel stability will repeat until such time as the relevant value of SEARCH COUNTER has exceeded its predetermined limit. If it is determined that the relevant value of SEARCH COUNTER has exceeded its predetermined limit, the process will enter a second phase of operation, hereafter referred to as the "learn mode", at step 714.

Figure 8:
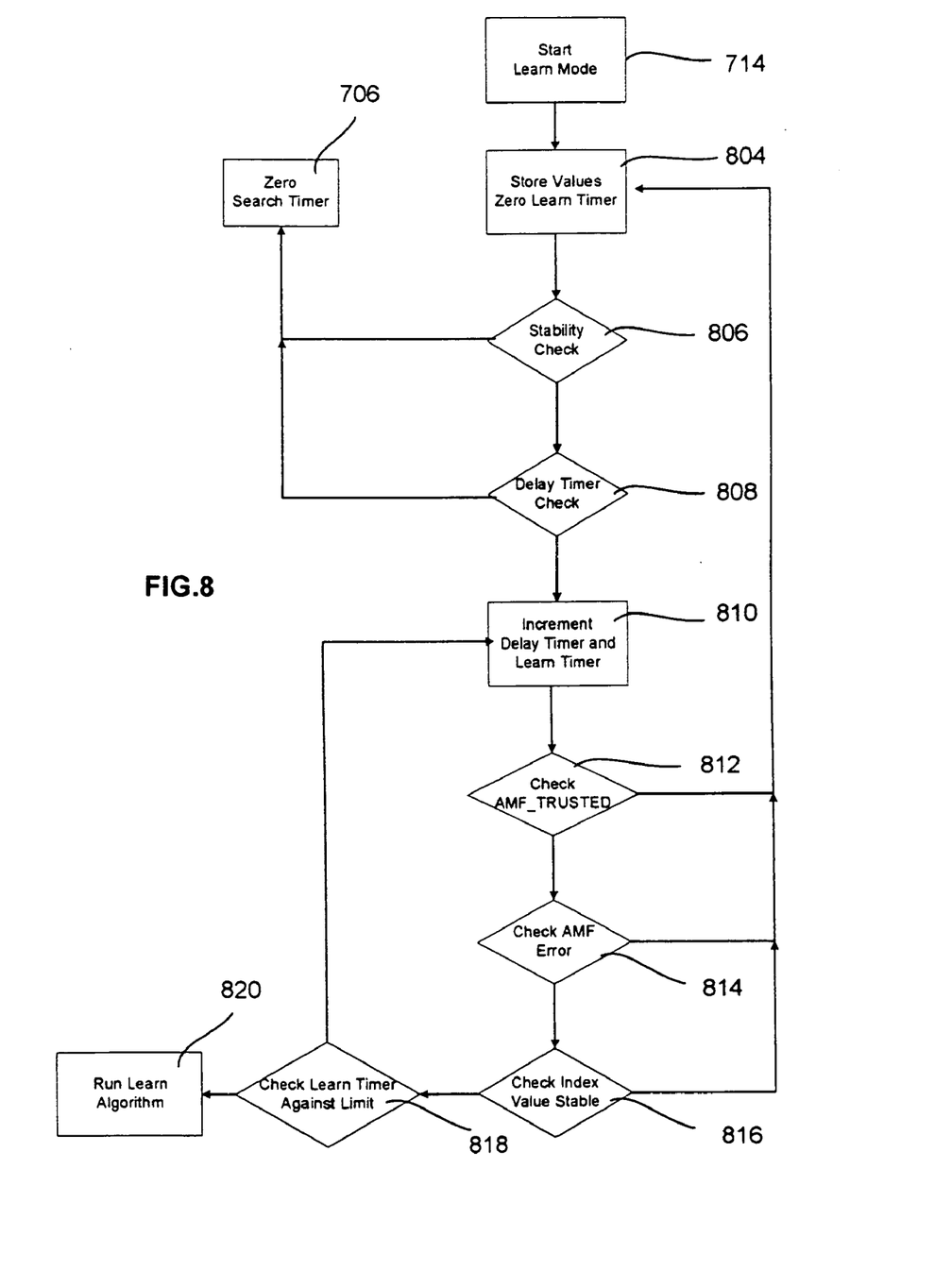
FIG. 8 is a functional flow diagram that represents an embodiment of the invention during the "learn mode"

The learn mode will now be described with reference to FIG. 8. When it is determined that SEARCH COUNTER has exceeded the predetermined limit for a relevant cell, as described above with reference to FIG. 7, the process initiates the learn mode by deactivating EGR at step 714. As described previously, it is necessary for EGR to be deactivated to remove its contribution to the airflow into the cylinders of the engine. As a result of deactivating EGR, the value of AMF_trusted is theoretically equal to the value measured by the air mass flow sensor 4.

In addition, at step 714 a further timer will start counting, the purpose of which is to record how long the process remains within the learn mode. The further timer will hereafter be referred to as "LEARN DELAY TIMER" and is incremented whilst the process is in the learn mode. If at any point the count of the LEARN DELAY TIMER exceeds a predetermined value then the process will exit the learn mode and return to the search mode at step 706 (also shown in FIG. 7) where the system will resume the search for enabling conditions. Since EGR has a beneficial effect on engine fuel economy and emissions, the LEARN DELAY TIMER ensures that EGR is not deactivated for longer than desired.

At step 804, another timer, hereafter referred to as "LEARN TIMER", is initialised to zero. In addition, the following values are recorded and stored: i) the current values of AMF_trusted as calculated by the AMF calculation module; ii) the difference between AMF_trusted and AMF_corrected (hereafter referred to as "AMF_error"); and iii) the AMF index value. The purpose of the LEARN TIMER is to ensure that the system waits until AMF_trusted, AMF_error and the AMF index value are stable for a predetermined period of time prior to implementing the learning module 14, as will be described in detail later.

At steps 806 and 808, respectively, the process will check whether the fuel demand is stable and the count of the LEARN DELAY TIMER is exceeded. At this point, if fuel demand becomes unstable, the system will exit the learn mode and return to the search mode at step 706 (also shown in FIG. 7). Similarly, if the count of the LEARN DELAY TIMER is exceeded, the system will exit the learn mode and return to the search mode at step 706.

However, if the LEARN DELAY TIMER is within its permissible limit, the count of the LEARN DELAY TIMER and the count of the LEARN TIMER are incremented at step 810 and the process will proceed to check the stability of AMF_trusted as calculated by the AMF calculation module (step 812), the stability of AMF_error (step 814) and the stability of the index value (AMF_index, step 816) as determined by the learn compensation module 12.

If any of the aforementioned values of AMF_trusted, AMF_error and AMF_index are determined to be unstable, that is to say if any of the values are outside a predetermined limit when compared with the previously determined value of the parameter, the process will loop back to step 804, at which point the count of the LEARN TIMER will be reset to zero.

If, during steps 812, 814 and 816, the values of AMF_trusted, AMF_error and AMF_index are determined to be stable, step 818 determines if the aforesaid parameters have been stable for a sufficient period of time by verifying whether the count of the LEARN TIMER has exceeded a predetermined limit. If not, the process loops to step 810, following which steps 812, 814 and 816 will be repeated until such time as the count of the LEARN TIMER has exceeded its predetermined limit.

The effect of the loop defined by steps 810 to 818 is therefore to judge how long it is necessary for the values of AMF_trusted, AMF_error and AMF_index to be within predetermined limits before initiating the learning module 14, for example, to allow the measured engine parameters to settle following deactivation of EGR. If all the aforementioned parameters are stable for a sufficient period of time, the learning module 14 will be implemented at step 820.

Figure 9:
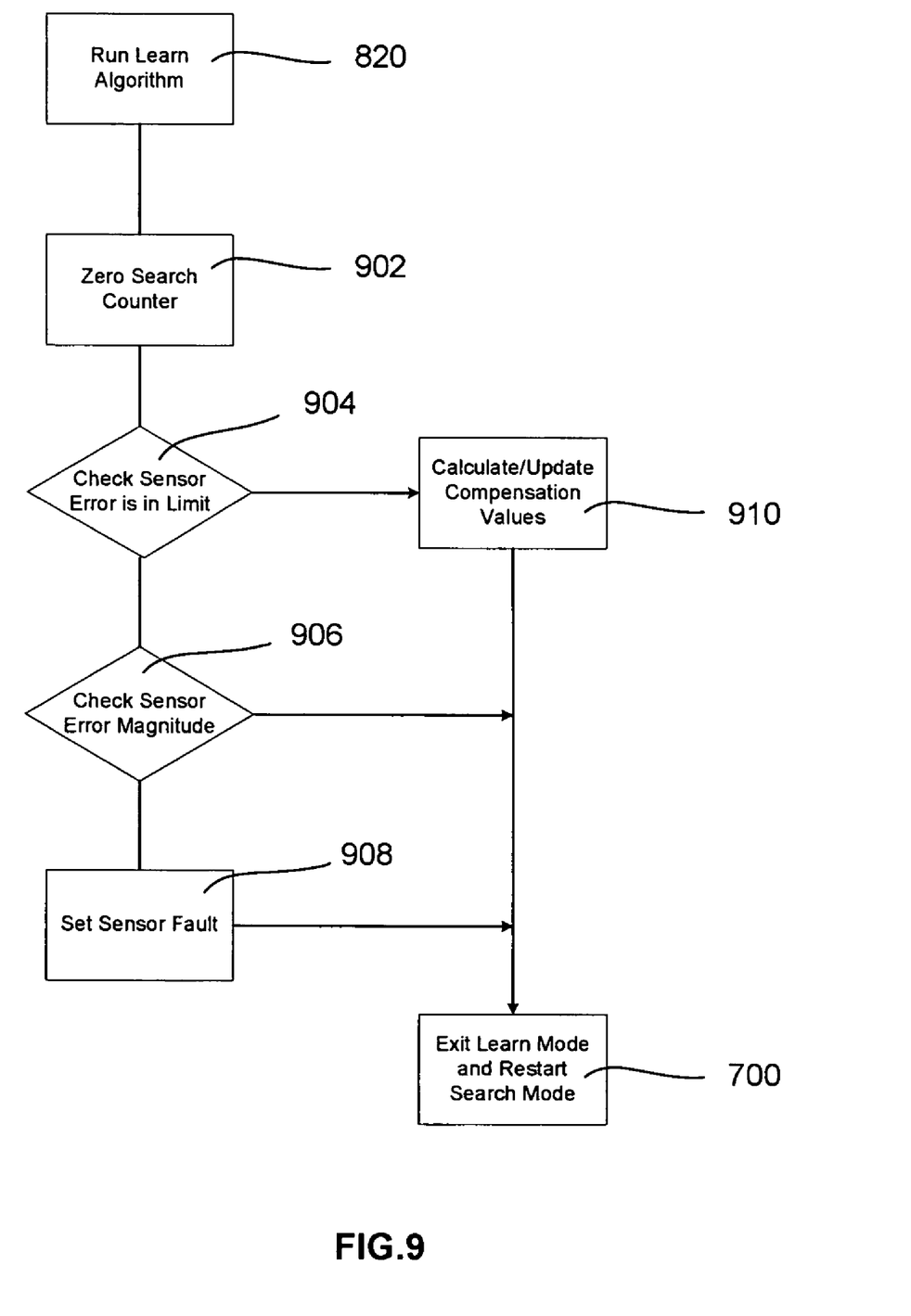
FIG. 9 is a functional flow diagram that represents an embodiment of the invention during the "calculation mode".

Referring now to FIG. 9, at step 902 the count of the SEARCH COUNTER that corresponds to the current value of AMF_index will be reset to zero. It will be understood that if the SEARCH COUNTER was not reset at this point, the process would not delay entering the learn mode if the enabling conditions are met during the next iteration through the process at the same value of AMF_index. A beneficial feature of the invention, therefore, is that step 902 ensures system resources are not unduly wasted by initiating the learning module more often than is necessary to update the compensation values stored by the learn compensation module 12.

At step 904, it is checked that the value of AMF_error is within predetermined maximum and minimum limits. Step 904 therefore ensures that the value of AMF_error has not changed significantly since it was last measured at step 814, due to the onset of sudden erratic driving conditions for example. If the value of AMF_error is outside the maximum and minimum limits, the system will not proceed to calculate revised compensation values. Instead, the system proceeds to step 906 where a further check is carried out on the value of AMF_error. Step 906 verifies whether or not the value of AMF_error merely represents an unstable value of AMF_error, such that meaningful learning data may not be calculated, or if the air mass flow sensor is outputting faulty data. If the air mass flow is determined to be faulty, a sensor fault flag will be set at step 908. The sensor fault flag is detectable by on-board vehicle diagnostic routines and logged by the engine management system 8 for the purposes of the next vehicle maintenance inspection. In addition, the fault flag may also trigger an audio/visual warning signal to the driver of the vehicle.

Following step 906, the process will return to the initialisation step 700 (also shown in FIG. 7). Thus, the system exits the learn mode and begins to search once again for enabling conditions.

If step 904 determines that the value of AMF_error is within acceptable error limits, the learning module 14 will be initiated at step 910 in order to calculate the compensation value that corresponds to the current value of AMF_index at which the engine is operating. A globally accessible flag may be set at this point to indicate that leaning is to be performed.

The learning process by which an appropriate cell within the compensation map 13 is updated with a revised value will now be described. Firstly, a gain factor is calculated, the purpose of which is to represent the magnitude of the difference between AMF_trusted and AMF_corrected. The gain factor (AMF_gain) is a function of the ratio of the trusted AMF to the corrected AMF, multiplied by a weighting factor. In this embodiment, the weighting factor may take two possible values which are dependent on whether the value of AMF_corrected is greater or less than the value of AMF_trusted. In practice, the weighting factor that is used will be derived empirically.

In this embodiment, the calculation of AMF_gain is expressed as:

$$AMF\_gain = 1 + AMF\_weight \times ((AMF\_trusted/AMF\_corrected) - 1).$$

As a result of the above expression, it will be understood that AMF_gain will be unity if the value of AMF_corrected is equal to the calculated value of AMF_trusted. Conversely, if the value of AMF_trusted does not equal AMF_corrected, AMF_gain will determine the responsiveness of subsequent calculations to drifting sensor signals.

The value of AMF_gain is then used to calculate the new value of AMF_compensation that will overwrite the previously stored value of AMF_compensation in the compensation map 13 within the cell corresponding to the current value of AMF_index.

The new value of AMF_compensation for the current value of AMF_index may be expressed as follows:

$$AMF\_Compensation[AMF\_index] = AMF\_gain[AMF\_index] \times (AMF\_measured[AMF\_index] + AMF\_compensation[AMF\_index]) - AMF\_measured[AMF\_index]$$

Thus, from the above expression, it will be understood that if AMF_corrected is equal to the calculated value of AMF_trusted (that is to say, if AMF_gain is unity), then the new value of AMF_compensation will be equal to the old value of AMF_compensation. In other words, the new compensation value will remain equal to the previously stored compensation value if the AMF sensor output is not drifting.

Also, and preferably at the same time, the learning module 14 updates the value of AMF_compensation at the right-hand adjacent index as seen in FIG. 6. Thus, the calculation of the value of AMF_compensation at the adjacent index point in the compensation map 13 may be expressed as:

$$AMF\_Compensation[AMF\_index+1] = AMF\_gain \times (AMF\_measured[AMF\_index+1] + AMF\_compensation[AMF\_index+1]) - AMF\_measured[AMF\_index+1]$$

The abovedescribed refinement therefore takes account of the fact that the value of AMF_measured is most likely to lie between two voltage/flow pairs. Referring to FIG. 6 as an example, point I lies between points C and D and, as has been described above, the calculations relating to AMF_compensation will relate to index I2 and I3 and the corresponding values in the compensation map will be updated.

As a further refinement, the system may also be configured to update the value of the compensation map at preferably two secondary adjacent index points. However, a modified value of AMF_gain is utilised for this calculation which is referred to as AMF_gain_spread. The use of AMF_gain_spread is of particular importance when the compensation map is being updated at index values corresponding to engine operating points that occur relatively infrequently. The updated compensation map value at a particular index therefore influences the compensation values at adjacent cells and the benefit of carrying out the learning process at one identified index will be distributed or 'spread' to adjacent cells. Referring once again to FIG. 6 as an example, although the compensation values in the compensation map 13 corresponding to indices I2 and I3 are updated as described above, the compensation values at indices I1 and I4 may also be updated, but by a lesser amount than the compensation map values at indices I2 and I3. Once the relevant values of the compensation map have been updated at step 910, the process returns to initialisation step 700.

Having described various embodiments of the invention, it will be understood by those who practice the invention, and those skilled in the art, that various modifications and improvements may be made to the invention without departing from the scope of the invention as defined by the claims. For example, it should be appreciated that the various predetermined limits referred to herein are application specific programmable variables that may be programmed at manufacture or upon installation into an engine controller or the appropriate control software embodying the invention. Such predetermined limits may be calculated by theoretical or empirical means. Furthermore, although the above invention has been described with reference to functional modules for the sake of clarity, i.e. learn compensation module 12 and learning module 14, it will be appreciated that it is not essential for the functionality of the invention to be embodied in this modular manner when the invention is implemented in on-board vehicle software.

The invention claimed is:

1. A method of compensating for the error of a signal indicative of the mass of air flow from an air mass flow sensor for an internal combustion engine, the method comprising:
   deriving an air mass flow value from an air mass flow sensor output;
   calculating a compensated air mass flow value based on the air mass flow value and a compensation value;
   calculating an estimated air mass flow value from engine operating parameter values;
   calculating a new compensation value based upon the compensated air mass flow value and the estimated air mass flow value; and
   using the new compensation value for subsequent calculations of the compensated air mass flow value;
   wherein the step of calculating a new compensation value is triggered by a timer having a plurality of predetermined limits.

2. The method as claimed in claim 1, wherein the air mass flow sensor has a corresponding interpolated data map representing air mass flow as a function of air mass flow sensor output, the air mass flow value being derived from the interpolated data map in response to the air mass flow sensor output.

3. The method as claimed in claim 2, wherein the interpolated data map is defined by a plurality of voltage/flow pairs.

4. The method as claimed in claim 3, wherein each of the plurality of voltage/flow pairs is identified by a respective index value.

5. The method as claimed in claim 4, wherein each index value relates to a predetermined engine operating region.

6. A method of compensating for the error of a signal indicative of the mass of air flow from an air mass flow sensor for an internal combustion engine, the method comprising:
   deriving an air mass flow value from an air mass flow sensor output;
   calculating a compensated air mass flow value based on the air mass flow value and a compensation value;
   calculating an estimated air mass flow value from engine operating parameter values;
   calculating a new compensation value based upon the compensated air mass flow value and the estimated air mass flow value; and
   using the new compensation value for subsequent calculations of the compensated air mass flow value;
   wherein the air mass flow sensor has a corresponding interpolated data map representing air mass flow as a function of air mass flow sensor output, the air mass flow value being derived from the interpolated data man in response to the air mass flow sensor output;
   wherein the interpolated data map is defined by a plurality of voltage/flow pairs;
   wherein each of the plurality of voltage/flow pairs is identified by a respective index value;
   wherein each index value relates to a predetermined engine operating region;
   wherein the compensation value is selected from a plurality of compensation values, the number of compensation values corresponding to the number of index values, and wherein the compensation value is selected based upon the index that is identified according to the current engine operating region.

7. The method as claimed in claim 6, wherein the plurality of compensation values are stored in the form of a one-dimensional data map.

8. A method of compensating for the error of a signal indicative of the mass of air flow from an air mass flow sensor for an internal combustion engine, the method comprising:
   deriving an air mass flow value from an air mass flow sensor output;
   calculating a compensated air mass flow value based on the air mass flow value and a compensation value;
   calculating an estimated air mass flow value from engine operating parameter values;
   calculating a new compensation value based upon the compensated air mass flow value and the estimated air mass flow value; and
   using the new compensation value for subsequent calculations of the compensated air mass flow value;
   wherein the air mass flow sensor has a corresponding interpolated data map representing air mass flow as a function of air mass flow sensor output, the air mass flow value being derived from the interpolated data map in response to the air mass flow sensor output;
   wherein the interpolated data map is defined by a plurality of voltage/flow pairs;
   wherein each of the plurality of voltage/flow pairs is identified by a respective index value; and
   wherein the step of calculating a new compensation value is triggered by a timer having a plurality of predetermined limits.

9. The method as claimed in claim 8, including incrementing the timer to count the number of times it is verified that each one of a plurality of enabling conditions is satisfied, wherein the step of triggering the calculation of a new compensation value is initiated when the number of times exceeds the predetermined limit for the associated engine operating region.

10. The method as claimed in claim 9, wherein the timer limits are selected to be relatively high for frequently encountered engine operating regions and relatively low for engine operating regions that are encountered infrequently.

11. The method as claimed in claim 9, wherein the step of verifying the plurality of enabling conditions includes comparing a first stored fuel demand value with a second stored fuel demand value and determining if the difference between the first and second stored fuel demand values is within a predetermined limit.

12. A method of compensating for the error of a signal indicative of the mass of air flow from an air mass flow sensor for an internal combustion engine, the method comprising:
deriving an air mass flow value from an air mass flow sensor output;
calculating a compensated air mass flow value based on the air mass flow value and a selected one of a plurality of compensation values, wherein each of the plurality of compensation values corresponds to a predetermined engine operating region;
calculating an estimated air mass flow value from engine operating parameter values;
calculating a new compensation value based upon the compensated air mass flow value and the estimated air mass flow value and updating a selected one of the plurality of compensation values with the new compensation value; and
using the new compensation value for subsequent calculations of the compensated air mass flow value;
wherein the step of calculating a new compensation value is triggered by a timer having a plurality of predetermined limits.

13. The method as claimed in claim 12, wherein the plurality of compensation values are stored in the form of a one-dimensional data map.

14. The method as claimed in claim 12, wherein the air mass flow sensor has a corresponding interpolated data map representing air mass flow as a function of air mass flow sensor output, the air mass flow value being derived from the interpolated data map in response to the air mass flow sensor output.

15. The method as claimed in claim 14, wherein the interpolated data map is defined by a plurality of voltage/flow pairs.

16. The method as claimed in claim 15, wherein each of the plurality of voltage/flow pairs is identified by a respective index value that relates to a predetermined engine operating region.

17. The method as claimed in claim 12, including incrementing the timer to count the number of times it is verified that each one of a plurality of enabling conditions is satisfied, wherein the step of triggering the calculation of a new compensation value is initiated when the number of times exceeds the predetermined limit for the associated engine operating region.

18. The method as claimed in claim 17, wherein the timer limits are selected to be relatively high for frequently encountered engine operating regions and relatively low for engine operating regions that are encountered infrequently.

19. An engine control system for use in an internal combustion engine, the engine control system including a compensating unit for compensating for the error of a signal indicative of the mass of air flow output from an air mass flow sensor for an internal combustion engine, the compensating unit including:
a deriving unit for deriving an air mass flow value from an air mass flow sensor output;
a summing unit for calculating a compensated air mass flow value based on the air mass flow value and a compensation value;
a calculating unit for calculating an estimated air mass flow value from engine operating parameter values; and
a learning unit for calculating a new compensation value based upon the compensated air mass flow value and the estimated air mass flow value and using the new compensation value for subsequent calculations of the compensated air mass flow value; and
a timer for triggering the learning unit to calculate the new compensation value, the timer having a plurality of predetermined limits.

* * * * *